J. GILMORE.
Horse Hay Fork.
No. 83,482.
Patented Oct. 27, 1868.
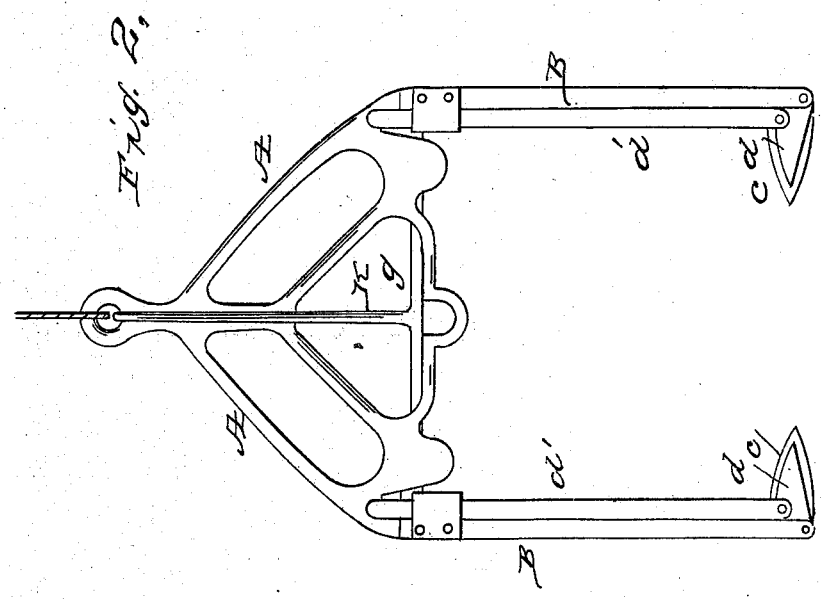
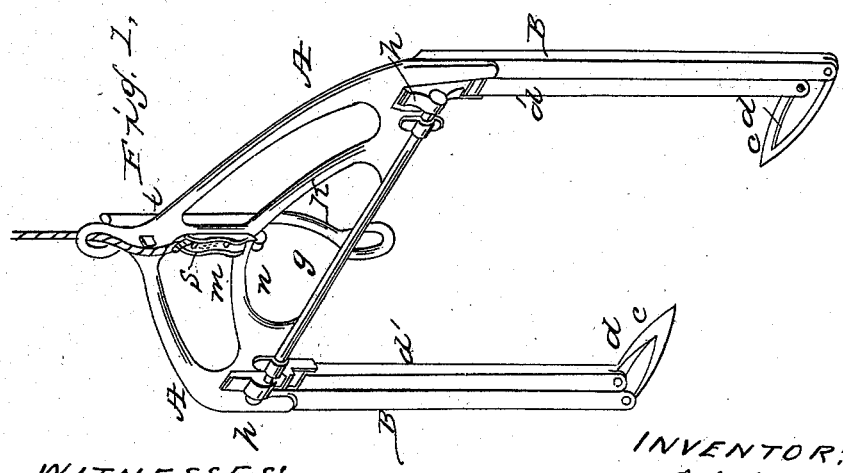

JOHN GILMORE, OF PHŒNIXVILLE, PENNSYLVANIA.

Letters Patent No. 83,482, dated October 27, 1868.

IMPROVEMENT IN HORSE HAY-FORKS.

The Schedule referred to in these Letters Patent and making part of the same.

*To all whom it may concern:*

Be it known that I, JOHN GILMORE, of Phœnixville, in the county of Chester, and State of Pennsylvania, have invented certain new and useful Improvements in Horse Hay-Forks; and I do hereby declare that the following is a full, clear, and exact description thereof, reference being had to the accompanying drawings, and to the letters of reference marked thereon, which form a part of this specification, in which—

Figure 1 is a perspective view of my hay-fork.

Figure 2 is a plan view of the same.

The nature of my invention consists in constructing hay-knives with two edges, and elevations on both sides, and operated in the manner and for the purpose hereinafter specified.

A represents the frame-work to which the tines or prongs B B are securely fastened. To the lower end of prongs B B are attached the knives C C, with a shank at their upper end, which enters an opening in said prongs, and are there pivoted. The knives C C have on each side an elevation, $d$, placed a little distance from the edges and points of said knives, the object of these elevations being to prevent the knives from cutting through the hay when in process of being elevated. The inner sides of knives C C are pivoted to the bars $d'$ $d'$. The upper ends of bars $d'$ $d'$ are furnished with teeth or cogs, the use of which will be hereafter explained.

$g$ represents a shaft, having its bearings on the side of frame A. Each end of shaft $g$ is furnished with a segment of wheel, marked $h$, the cogs on which will gear into the corresponding cogs on bars $d'$ $d'$. In order to operate the shaft $g$, the arm $k$ is securely fastened to it.

$m$ designates a metal latch, confined between two flanges on the frame A. The upper part of latch $m$ is encircled by a wire spring, $s$, the office of which will be hereafter seen.

On the upper side of arm $k$ is the catch $n$, which is intended to receive the lower end of latch $m$, when said latch is forced outwards by the action of the wire spring $s$.

The upper end of latch $m$ is furnished with an eye, through which a cord is passed, and there firmly secured. The loose end of the cord is then passed over pulley $t$, through an eye at the top of frame A, and into the hands of the operator.

In operating my hay-fork, the cord attached to the latch $m$ will be drawn back until said latch is disengaged from catch $n$; then press the arm $k$ downwards, and the segments $h$ will act on the cogs in bars $d'$ $d'$, and force said bars downwards, which will bring the knives in a line with prongs B B, and in position to enter the hay. The arm $k$ will now be returned to a vertical position, the latch $m$ suffered to enter the catch, and the knives C C, by this operation, will be placed at right angles with prongs B B, and in condition to support the hay while the fork is being elevated.

Having thus described my invention,

What I claim, and desire to secure by Letters Patent, is—

The turning-knives C C, provided with the projecting pieces $d$ $d$, to prevent the knives from cutting through the hay when the latter is being elevated, substantially as set forth.

In testimony that I claim the foregoing as my own, I affix my signature in presence of two witnesses.

JOHN GILMORE.

Witnesses:
  P. G. CAREY,
  JOSEPH TRAUT.